United States Patent [19]
Kato et al.

[11] Patent Number: 6,119,341
[45] Date of Patent: Sep. 19, 2000

[54] METHOD OF MANUFACTURING FLAT TUBES FOR HEAT EXCHANGER

[75] Inventors: Soichi Kato; Takashi Sugita, both of Saitama, Japan

[73] Assignee: Zexel Corporation, Tokyo, Japan

[21] Appl. No.: 08/437,808

[22] Filed: May 9, 1995

[30] Foreign Application Priority Data

May 12, 1994 [JP] Japan .................................. 6-098511

[51] Int. Cl.⁷ .................................................. B23P 15/26
[52] U.S. Cl. ................................ 29/890.053; 29/890.054
[58] Field of Search ...................... 29/890.053, 890.054; 228/183

[56] References Cited

U.S. PATENT DOCUMENTS

| | | | |
|---|---|---|---|
| 4,688,311 | 8/1987 | Saperstein et al. ................. | 29/890.053 |
| 4,852,233 | 8/1989 | Kawase .............................. | 29/890.053 |
| 4,945,635 | 8/1990 | Nobusue et al. ..................... | 228/183 |
| 5,102,032 | 4/1992 | Cottone et al. ...................... | 228/183 |
| 5,322,209 | 6/1994 | Barten et al. ........................ | 228/183 |

FOREIGN PATENT DOCUMENTS

| | | | |
|---|---|---|---|
| 5169245 | 7/1993 | Japan ................................... | 228/183 |

*Primary Examiner*—Irene Cuda
*Attorney, Agent, or Firm*—Kanesaka & Takeuchi

[57] ABSTRACT

A method of manufacturing flat tubes by forming a flat tube body from a single plate material which is continuously drawn from a drum by either folding it into two or placing two plate materials one upon the other, and cutting the flat tube body in a predetermined length. The method is characterized by the steps of placing the plate material with its inner surface facing downwardly at any selected stage before completion of folding the plate into two, or before completion of placing two plates one upon the other; fluxing the inner surface of the plate material with a liquid flux material, and drying the applied flux material.

2 Claims, 7 Drawing Sheets

METHOD OF MANUFACTURING FLAT TUBES FOR HEAT EXCHANGER

BACKGROUND OF THE INVENTION

Conventionally known tube-stacking heat exchanger comprises a plurality of flat tubes being stacked one upon another, their ends are connected with a header tank, and a heat exchanger medium flows between an inlet joint and an outlet joint of the header tank in a serpentine form by making a plurality of turns.

The aforementioned flat tube for such tube-stacking heat exchanger is known, for example, as disclosed in (1) Japanese Utility Model Laid-Open Publication No. 59(1984)-59688 and (2) Japanese Patent Laid-Open Publication No. 3(1991)-155422.

The flat tube disclosed in the above-mentioned prior art (1) is, for example, as shown in FIG. 9, that a flat tube 2 comprises two plates 12 and 12 which are placed one upon the other, each plate having a plurality of projecting portions 16 projecting inwardly with their forward ends in pressure contact with projecting portions of the other plate, and connecting portions 14, 14 of edges of plates 12, 12 are joined together by brazing.

The flat tube disclosed in the above-mentioned prior art (2) is, for example, as shown in FIG. 10, that a flat tube 2 is formed by a single plate 12 of a predetermined size having a plurality of projecting portions (herein after called beads) 16, and the single plate 12 being folded into two at a center folding portion 13 and connecting portions 14, 14 of the edges are joined together by brazing.

For assembling and brazing the tube-stacking heat exchanger using the above-mentioned flat tubes, corrugated fins are placed alternately with a plurality of flat tubes, the ends of flat tubes are inserted into tube insertion holes of header tanks, and thus assembled body is placed on, for example, a belt conveyor, for fluxing the inside and then fluxing the outside, and finally the assembled body is brazed integrally in a furnace.

However, with conventional method of manufacturing the heat exchanger, the flux material does not reach the inner surface of each flat tube when fluxing after assembly of heat exchanger, because the flat tube was manufactured with the side edge connecting portions tightly connected with each other. This inconveniently causes defective brazing, namely, the inner surfaces of flat tubes are not properly brazed.

For this reason, conventional method includes two separate stages for fluxing inside and outside of each flat tube. For fluxing the inner surface of flat tube, a flux material is applied to the tube plate with a brush or roll.

However, for applying the fluxing material with brush it should be done manually which inevitably increases the number of manufacturing steps. Further, fluxing with a roll, the roll must be first immersed in the flux material and then the roll is pressed against the tube plate. In this manner, it is difficult to have the flux material properly deposited on the tube plate, and if the pressing of the roll against the tube plate is too strong, connecting portions of beads might be deformed.

The present invention provides a method of manufacturing tube-stacking heat exchanger assuring fluxing of the inner surface of each flat tube, regardless of whether the heat exchanger uses the flat tube formed by a single plate being folded into two or by two plates placed one upon the other.

SUMMARY OF THE INVENTION

The present invention relates to a method of manufacturing flat tubes for a tube-stacking heat exchanger comprising the steps of continuously drawing out a plate material from a drum, forming a flat tube body from a single plate material by folding it into two, and cutting the flat tube body into a predetermined length to form individual flat tubes, the method is characterized by the steps of:

placing the plate material with its inner surface facing downwardly at any selected stage before completion of folding the plate material into two, fluxing the inner surface of the plate material with a liquid flux material, and drying the applied flux material.

The present invention further relates to a method of manufacturing flat tubes for a tube-stacking heat exchanger comprising the steps of continuously drawing out a plate material from a drum, forming a plate in a predetermined form, placing two plates one upon the other to form a flat tube body, and cutting the flat tube body to a predetermined length to form individual flat tubes, the method is characterized by the steps of:

placing the plate material with its inner surface facing downwardly at any selected stage prior to completion of placing two plates one upon the other, fluxing the inner surface of the plate material with a liquid flux material, and drying the applied flux material.

According to the present invention, in forming the flat tube, regardless of whether it is formed by folding a single plate into two or placing two plates one upon the other, the inner surface of the tube faces downwardly at any selected stage before the final forming step, and the inner surface of the plate material is fluxed with a liquid flux material. The fluxing is performed by, for example, shower jet of liquid flux material. The applied flux material is dried in the subsequent drying step, allowing the flux material to be deposited on the inner surface of the plate material, thereby to form the flat tube having its inner surface applied with the flux material.

In manufacturing the tube-stacking heat exchanger, corrugated fins are interposed between adjacent flat tubes by means of a jig and a plurality of flat tubes are assembled in a stacked form alternately with fins, and insertion ends of each flat tube are inserted into insertion holes of header tank to assemble the heat exchanger. During the process of brazing the assembled heat exchanger, fluxing is performed from the upper and outer of the heat exchanger. Then, in a brazing furnace, a temperature is gradually raised, and thereafter cooled, and finally each connecting portion is joined together with the header tank by the brazing material cladding the flat tubes and header tank.

According to the present invention, the flux material is applied to the inner surface of the flat tube during forming thereof, and conventional method of fluxing twice after assembly of the heat exchanger is eliminated. This allows reduction of the number of manufacturing steps. Further, applying the flux material manually with a brush is no longer required so that the number of steps of manufacturing the heat exchanger is reduced greatly. Still further, with the present invention, the inner surface of flat tube is so placed as to face downwardly in the stage of a half-way forming of the flat tube, and the fluxing is performed from down to upward by, for example, shower jet. This manner assures application of flux material to the entire inner surface of the flat tube, and unnecessary extra flux material drops by its own weight, so that it is possible to provide properly fluxed flat tubes. Consequently, brazing of the assembled heat exchanger integrally is made possible, which allows manufacturing of a highly reliable heat exchanger without any liquid leakage, with a greatly reduced number of manufacturing steps.

DESCRIPTION OF THE PREFERRED EMBODIMENT

Now an embodiment of the present invention will be described by referring to the accompanying drawings.

Figure 1:
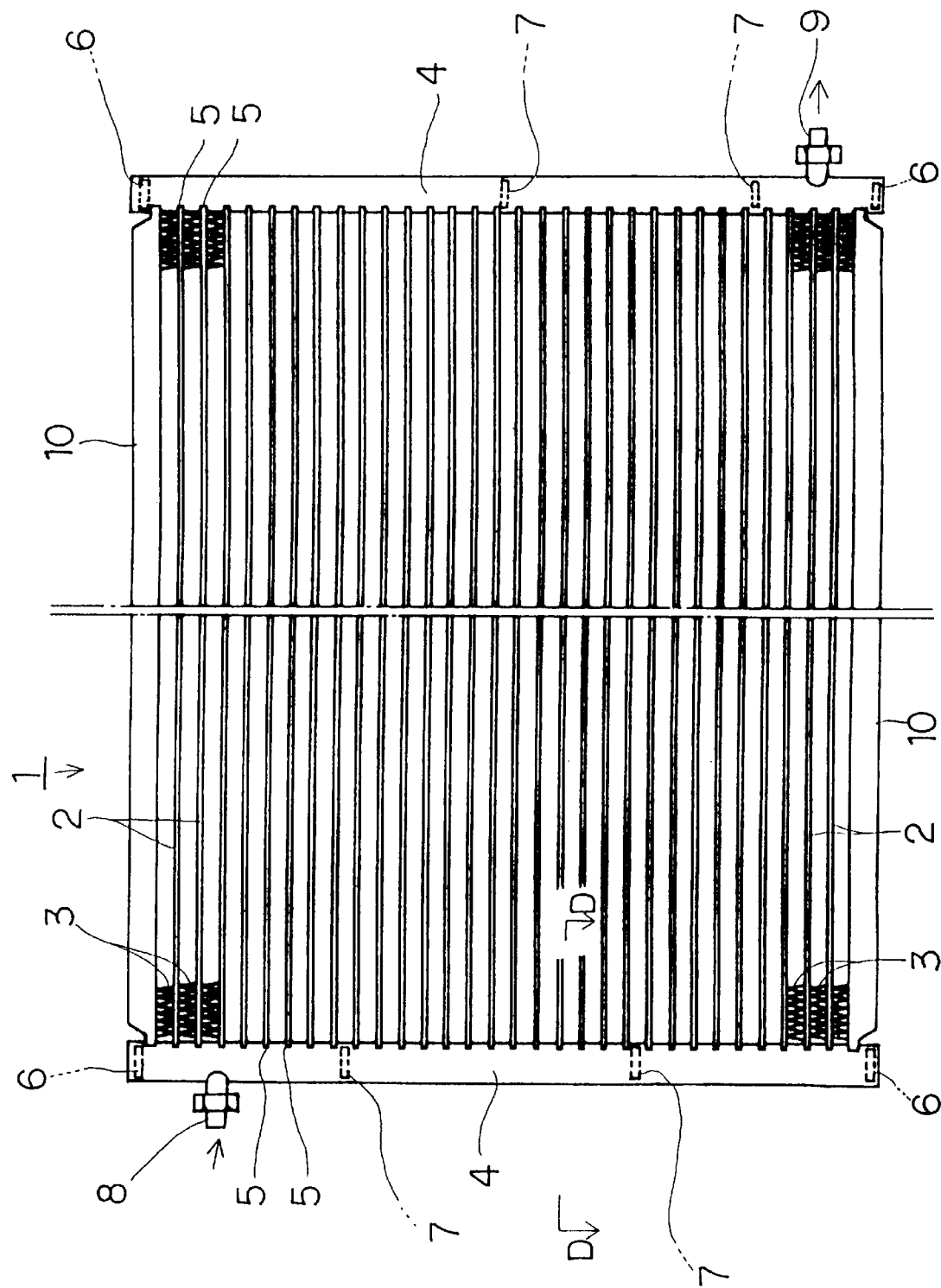
FIG. 1 is a front view of a tube-stacking heat exchanger of an embodiment of the present invention.

FIG. 1 is a front view of a tube-stacking heat exchanger 1 which uses a flat tube formed from a single plate material being folded into two.

Figure 2:
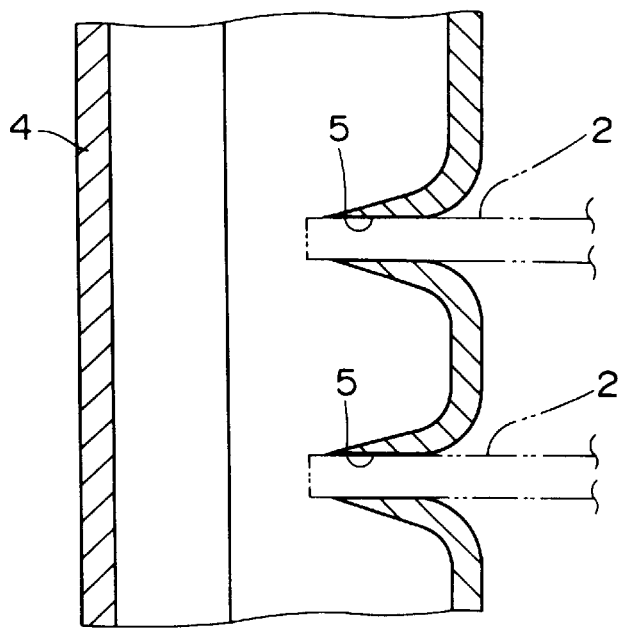
FIG. 2 is a sectional view in the direction of arrows along the line D—D of FIG. 1 illustrating a vertical section of the header tank.

In this embodiment, the tube-stacking heat exchanger 1 comprises a plurality of flat tubes 2 stacked alternately with corrugated fins 3 each interposed between adjacent flat tubes 2, as shown in FIG. 1, and the ends of these flat tubes are inserted into insertion holes 5 provided in each header tank 4, as shown in FIG. 2. An opening at the upper and the lower portions of each header tank 4 is covered with a partition cap 6, and partition plates 7 are positioned at predetermined places in each header tank 4. Further, the header tank 4 is provided with an inlet joint 8 and an outlet joint 9, and a heat-exchanger medium flows between the inlet and outlet joints 8 and 9 in a serpentine form by making a plurality of turns. The header tank 4 is formed by bending the plate material into a circle. In FIG. 1, numeral 10 designates a side plate arranged respectively at the upper and the lower sides of the flat tube 2.

Figure 3:
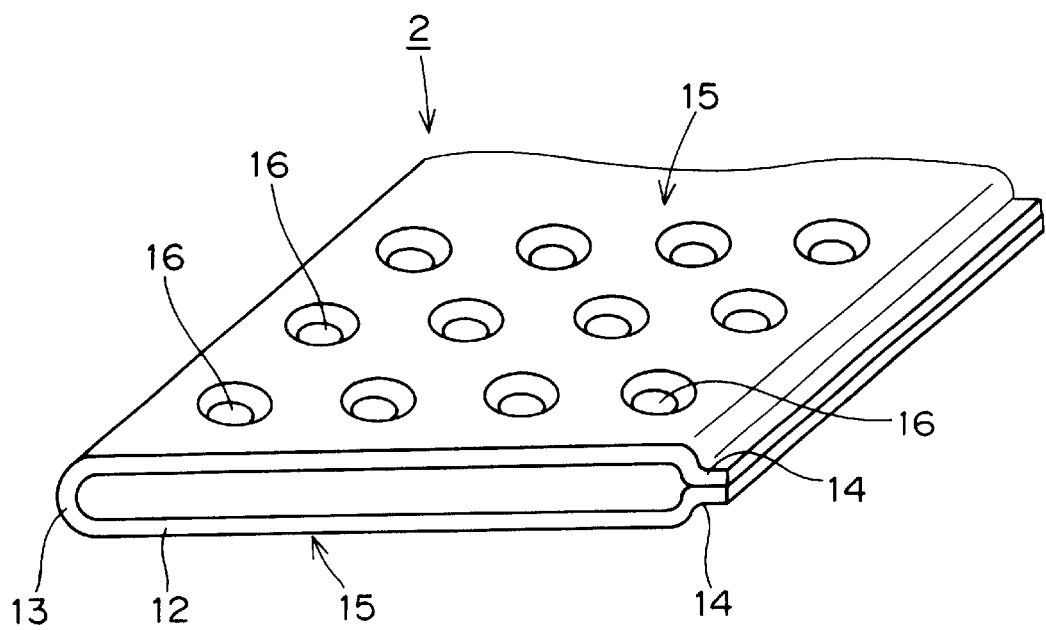
FIG. 3 is a perspective view of the flat tube.
Figure 7:
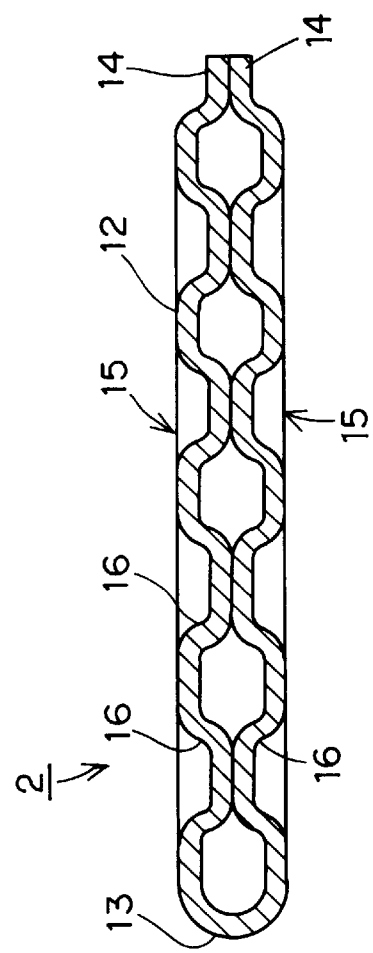
FIG. 7 is a sectional view in the direction of arrows along the line C—C of FIG. 4 showing a vertical section of the finally formed flat tube.

Referring to FIGS. 3 and 7, each flat tube 2 of this embodiment is formed by a single plate material 12 being folded into two at a folding portion 13. Forming the tube in a predetermined configuration is made by, for example, a press forming or a roll forming. The plate material 12 comprises an aluminum material (including aluminum alloy) having both surfaces coated with a brazing material. The flat tube 2 includes longitudinal connecting portions 14, 14 at one side, and each flat surface 15 is formed to swollen outwardly. On each flat surface, there are provided a plurality of circular beads 16, projecting inwardly so that the forward ends of beads 16 are in pressure contact with that of the other plate. Due to the presence of beads 16, a turbulence is caused in the heat-exchanger medium which passes through the tube, thereby to improve the heat exchanger efficiency, and increases the strength of the flat surface 15 of the tube, resulting in improving heat-resistance of the heat exchanger.

At the time when the flat tube 2 is formed into the final configuration, it is finished with a flux material deposited on the inner surface of the plate material 12 of the flat tube 2, and the flat tube 2 in this state is assembled together with the header tank 4 to form the tube-stacking heat exchanger.

The steps of manufacturing the flat tube of the above described structure will be described below.

Figure 4:
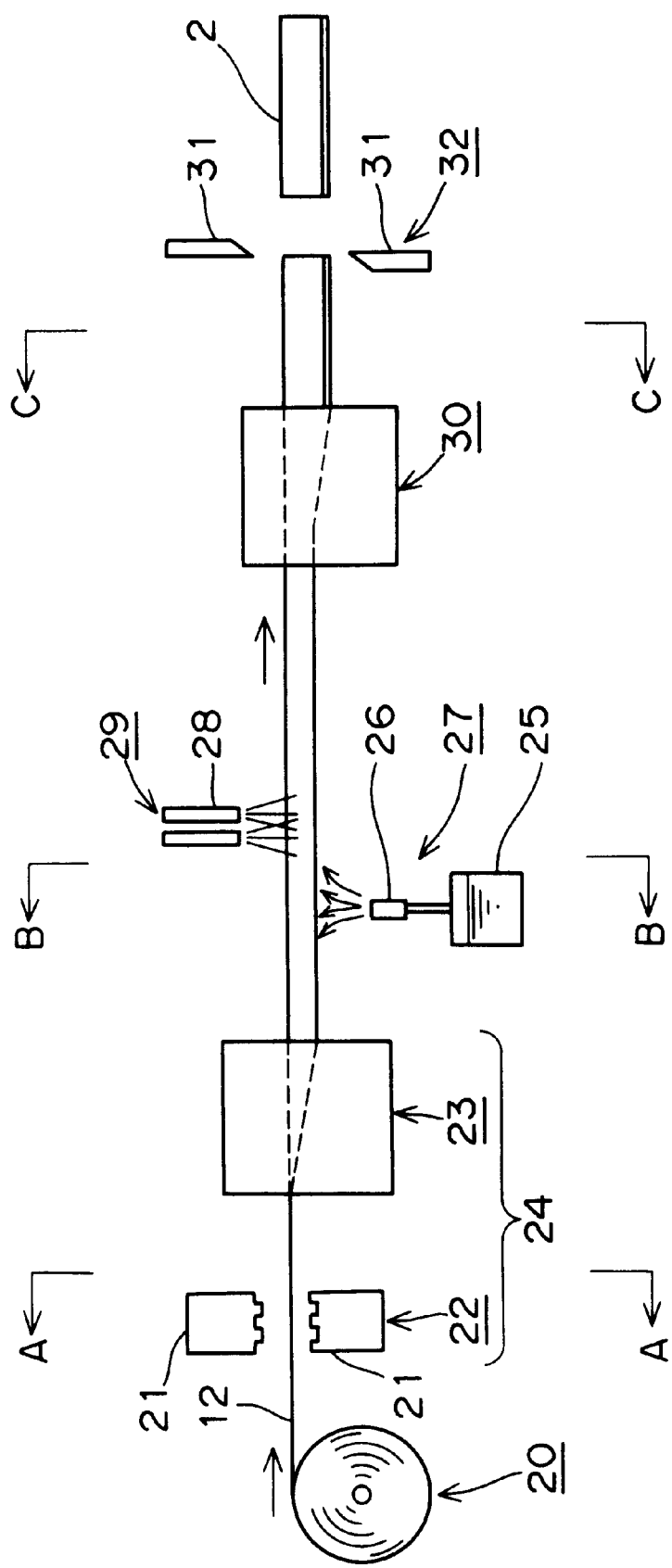
FIG. 4 is a schematic diagram of the steps of manufacturing the flat tube.
Figure 5:
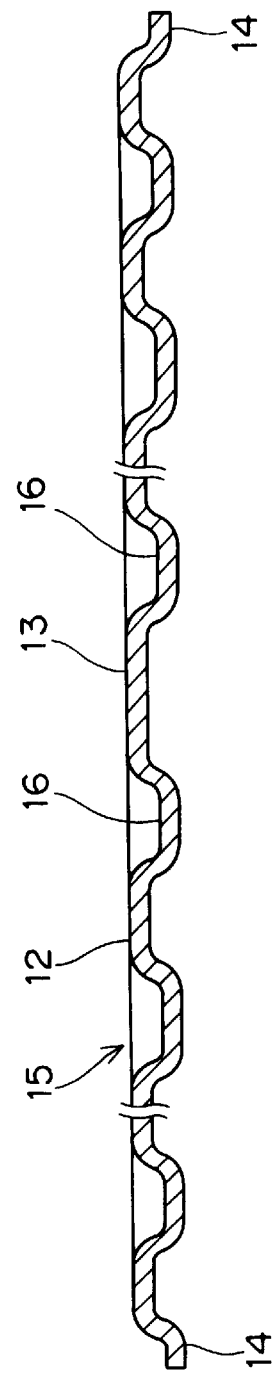
FIG. 5 is a sectional view in the direction of arrows along the line A—A of FIG. 4 illustrating a vertical section of the formed plate material.

The flat tube 2 of this embodiment is formed by the manufacturing steps as shown in FIG. 4.

Figure 6:
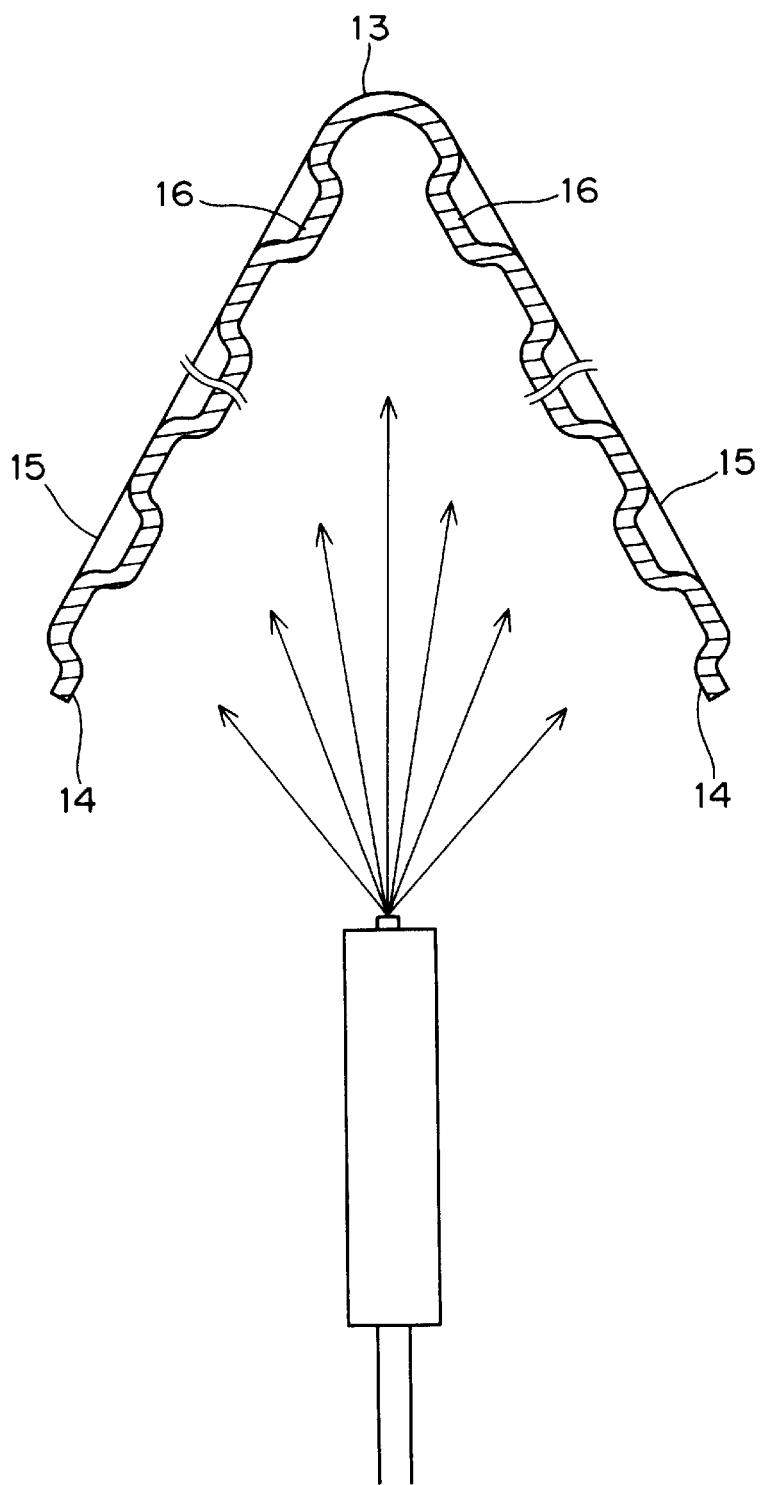
FIG. 6 is a sectional view in the direction of arrows along the line B—B of FIG. 4 showing a vertical section of the half-way formed flat tube.

In FIG. 4, numeral 20 designates a drum around which the plate material 12 is wound, and the manufacturing process comprises a forming step 24 for forming the plate material 12 into a half-way formed flat tube, as shown in FIG. 6, from upstream towards downstream along the direction of feeding the plate material 12 continuously from the drum 20; a fluxing step 27 for applying the flux material to the inner surface of the half-way formed flat tube 2; a drying step 29 for drying the applied flux material; a final forming step 30 for forming the flat tube in the final configuration as shown in FIG. 7; and a cutting step 32 for cutting the flat tube 2 in a predetermined length.

The forming step 24 comprises a press forming step 22 and a roll forming step 23. In the press forming step 22, the plate material 12 drawn out from the drum 20 is formed with a pair of connecting portions 14, 14 and a plurality of beads by means of a mold 21, and the inner surface of the flat tube faces downwardly, as shown in FIG. 4.

In the roll forming step 23, the flat tube 2 in the half-way form with flat surfaces 15, 15 at both sides are open to a predetermined angle to either direction from the center folding portion 13, as shown in FIG. 6, so that the inner surface of the flat tube 2 faces downwardly. The predetermined angle of opening of the flat surfaces 15, 15 may be such an angle which facilitates application of flux material to the inner surface of flat tube in the fluxing step which will be described below.

The fluxing step 27 comprises a tank 25 containing a liquid flux material, a nozzle 26 for spraying the flux material, and a pump (not shown) for pressure supply of the flux material from the tank 25 to the nozzle 26. The nozzle 26 is arranged under the flat tube 2, as shown in FIG. 6, and the liquid flux material is shower sprayed from this nozzle 26 towards the inner surface of the half-way formed flat tube 2, thereby the flux material is applied to the entire inner surface of this half-way formed flat tube 2. During this flux step 27, extra and unnecessary liquid flux material drops by its own weight thereby proper fluxing is achieved.

The drying step 29 comprises a blower (not shown) for supplying hot dry air, and a nozzle 28 for blowing the hot air to the flat tube 2. The nozzle 28 is arranged above the half-way formed flat tube 2 for blowing hot dry air to the outer surface of the flat tube 2 so as to dry the flux material deposited on the inner surface of the flat tube 2, and, as a result, the flux material is solidified on the inner surface of the half-way formed flat tube 2.

The final forming step 30 includes a plurality of rolls for forming the half-way formed flat tube 2 into the final configuration, as shown in FIG. 7.

The cutting step 32 includes a cutter 31 for cutting the continuously formed flat tube 2 in a predetermined length to meet a specification of the heat exchanger 1. Then, forming of individual flat tubes 2 each having the fluxed inner surface is achieved.

For drying the fluxed material, other drying method than the above-described method may be used, such as, passing the flat tube through a heating area of, for example, a drying furnace.

For manufacturing the tube-stacking type heat exchanger using the above-described flat tubes, corrugated fins 3 are each interposed between adjacent flat tubes 2 by means of a jig so that a plurality of flat tubes 2 and fins 3 are alternately stacked and the ends of each flat tube 2 are inserted into insertion holes 5 of the header tank 4, thereby the heat exchanger is assembled.

The assembled heat exchanger is brazed integrally by conventional brazing method and the liquid flux material is shower sprayed by a fluxing means over the outer surface of heat exchanger 1 from the upper surface thereof, only once. Thereafter, in a brazing furnace, a temperature of the fluxed heat exchanger 1 is gradually raised and then, the heat exchanger is subjected to cooling, thereby each connecting portion is joined with the other connecting portion by the brazing material cladding the flat tube 2 and the header tank 4, thereby the heat exchanger 1 is manufactured.

According to this embodiment, the inner surface of flat tube is fluxed during its forming. Consequently, fluxing of the heat exchanger after assembly as conventionally done is performed only once, and conventional fluxing performed manually with a brush is eliminated, so that the number of manufacturing steps is greatly reduced.

Further, in forming the half-way formed flat tube, the inner surface of the flat tube is so placed to face downwardly, and in the fluxing step the flux material is shower sprayed from below to upward towards the inner surface of the flat tube, so that it assures application of the liquid flux material to the entire inner surface, and extra and unnecessary liquid flux material drops by its own weight. Thus, a suitable flux application is achieved.

Consequently, brazing of the heat exchanger assembly integrally is made sure, thereby a heat exchanger having no liquid leakage is manufactured, with a greatly reduced number of manufacturing steps.

Figure 9:
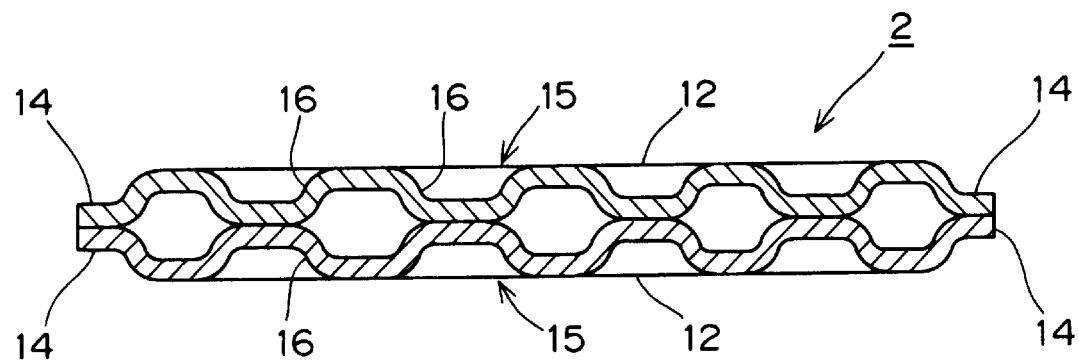
FIG. 9 is a vertical sectional view of a prior art flat tube.
Figure 10:
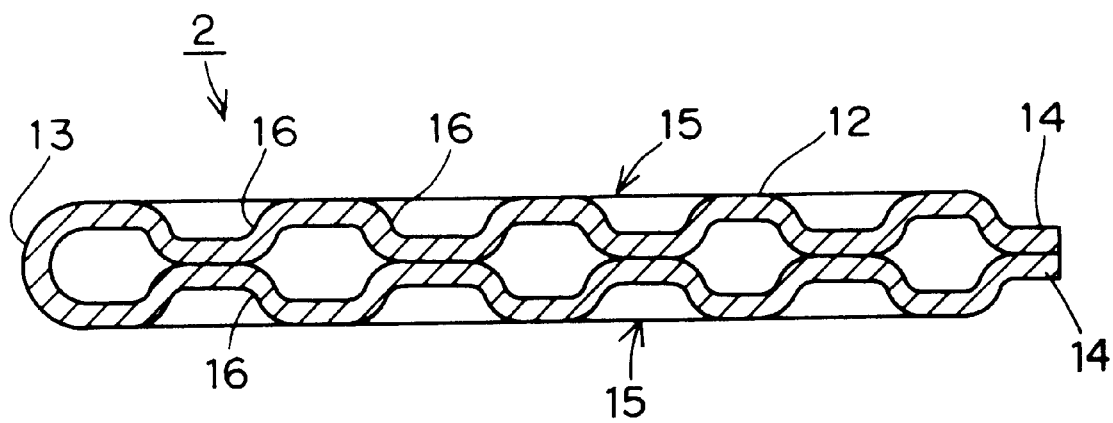
FIG. 10 is a vertical sectional view of another prior art flat tube.

The present invention is not limited to the above-described embodiment wherein the flat tube is formed by folding a single plate material 12 into two, but the present invention may also be applied to the flat tube 2 formed by two plate materials 12 placed one upon the other, as shown in FIG. 9.

In this another embodiment, each of two plate materials 12 is formed separately. For forming each plate material 12 into the flat tube, the roll forming step 23 and the final forming step 30 as described above for the first embodiment (forming the flat tube from the single plate material 12 by folding it into two) are omitted, namely, the forming step 24 is the final forming step in this embodiment. In this manner, each plate material 12 having the fluxed inner surface is formed.

Figure 8:
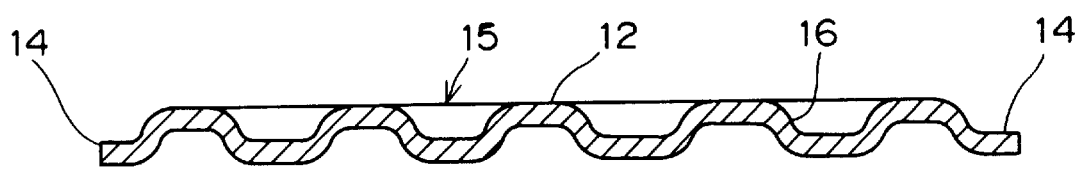
FIG. 8 shows another embodiment of the present invention illustrating a vertical sectional view of the plate material which forms flat tube.

In the press forming step 22 of the forming step 24, the plate material 12 including connecting portions 14, 14 at both edges of the plate and having a plurality of beads 16 on the flat surface 15, as shown in FIG. 8, is formed with its inner surface facing downwardly. Then, as in the case of the first embodiment, the liquid flux material is shower sprayed from the nozzle 26 towards the inner surface of the plate material 12.

In the drying step 29, the fluxed material is dried by blowing hot air, and the tube is cut in a predetermined length in the cutting step 32.

For assembling the heat exchanger 1, a pair of plate materials 12 are placed one upon the other and assembled with the header tank 4. Then, the assembled body is brazed integrally, thereby to manufacture the heat exchanger 1 which provides the same effect as the heat exchanger 1 of the first embodiment.

In the above-described embodiments, both sides of each flat tube are inserted into the header portion. However, the present invention may also be applied to the cases where the header portion is only at one side of the tube assembly, or both ends of each flat tube are not inserted, but only butting with the header portion.

What is claimed is:

1. In a method of manufacturing flat tubes for a tube-stacking heat exchanger comprising the steps of continuously drawing out a plate material from a drum, forming a flat tube body from a single plate by folding it into two, and cutting the flat tube body into a predetermined length to form individual flat tubes, the method is characterized by the steps of:

placing the plate material with its inner surface facing downwardly at any selected stage before completion of folding the plate into two, providing a nozzle for spraying a flux material upwardly and fluxing the inner surface of the plate material with the flux material when the plate material passes over the nozzle, and drying the applied flux material.

2. In a method of manufacturing flat tubes for a tube-stacking heat exchanger comprising the steps of continuously drawing out a plate material from a drum, forming the plate material in a predetermined plate form, placing two plates one upon the other to form a flat tube body, and cutting the flat tube body in a predetermined length to form individual flat tubes, the method is characterized by the steps of:

placing the plate material with its inner surface facing downwardly at any selected stage prior to placing two plates one upon the other, providing a nozzle for spraying a flux material upwardly and fluxing the inner surface of the plate material with the flux material when the plate material passes over the nozzle, and drying the applied flux material.

* * * * *